(12) United States Patent
Santoro et al.

(10) Patent No.: US 12,272,938 B2
(45) Date of Patent: Apr. 8, 2025

(54) CONDUIT BODY ASSEMBLIES HAVING ATTACHED COVERS

(71) Applicant: Hubbell Incorporated, Shelton, CT (US)

(72) Inventors: Nicholas Adam Santoro, Edwardsville, IL (US); Michael Charles Schinner, Afton, MO (US); Christopher John Minski, St. Louis, MO (US); William Michael Maass, St. Louis, MO (US); Ray Melton Lazalier, Lake Saint Louis, MO (US)

(73) Assignee: Hubbell Incorporated, Shelton, CT (US)

( * ) Notice: Subject to any disclaimer, the term of this patent is extended or adjusted under 35 U.S.C. 154(b) by 74 days.

(21) Appl. No.: 18/183,206

(22) Filed: Mar. 14, 2023

(65) Prior Publication Data
US 2023/0291187 A1    Sep. 14, 2023

Related U.S. Application Data

(60) Provisional application No. 63/319,648, filed on Mar. 14, 2022.

(51) Int. Cl.
*H02G 3/04* (2006.01)
(52) U.S. Cl.
CPC ................ *H02G 3/0418* (2013.01)
(58) Field of Classification Search
None
See application file for complete search history.

(56) References Cited

U.S. PATENT DOCUMENTS

| | | | | |
|---|---|---|---|---|
| 863,427 A * | 8/1907 | Nikonow | ............ | B65D 50/068 16/373 |
| 927,219 A * | 7/1909 | Burns | ...................... | H02G 3/06 174/152 G |
| 1,228,127 A * | 5/1917 | Olley | .................... | F16L 15/006 285/388 |
| 1,229,665 A * | 6/1917 | Sixma | .................... | F16L 17/04 285/133.4 |
| 1,628,406 A * | 5/1927 | Horton | .................... | H02B 1/03 361/660 |
| 1,662,275 A * | 3/1928 | Lane | ........................ | H02G 3/123 439/142 |
| 1,744,706 A * | 1/1930 | Hanny | ...................... | H02B 1/46 174/50 |
| 2,763,707 A * | 9/1956 | Soderberg | .............. | H02G 11/02 174/50 |
| 2,877,288 A * | 3/1959 | Bollmeier | .............. | H02G 15/10 174/76 |

(Continued)

FOREIGN PATENT DOCUMENTS

CA        2636223 A1 *  2/2009  ............... H02G 3/06

*Primary Examiner* — Krystal Robinson
(74) *Attorney, Agent, or Firm* — Ruggiero McAllister & McMahon LLC

(57) ABSTRACT

An electrical conduit body assembly is provided. The assembly includes a body portion, a cover, and a movable connection. The movable connection connects the body portion and the cover to one another so that the cover can be moved with respect to the body portion between an open state and a closed state in a manner that prevents the cover from being misplaced or disassociated from the body portion.

20 Claims, 13 Drawing Sheets

(56) References Cited

U.S. PATENT DOCUMENTS

| | | | | |
|---|---|---|---|---|
| 2,967,722 | A | 1/1961 | Lifka | |
| 3,003,794 | A * | 10/1961 | Burley | H02G 3/0608 174/101 |
| 3,570,546 | A * | 3/1971 | Jackson | H02G 3/0608 138/155 |
| 5,665,938 | A * | 9/1997 | Boshear | G09F 13/0413 40/575 |
| 5,901,986 | A | 5/1999 | Kirma | |
| 5,931,432 | A | 8/1999 | Herold et al. | |
| 6,069,317 | A * | 5/2000 | Wagganer | H02G 3/088 174/650 |
| 6,204,446 | B1 | 3/2001 | Parduhn | |
| 7,057,104 | B1 * | 6/2006 | McCleskey | H02G 3/06 174/505 |
| 7,484,711 | B2 * | 2/2009 | Pyron | H02G 1/085 254/134.3 R |
| 7,893,363 | B2 * | 2/2011 | Pyron | H02G 3/06 248/300 |
| 8,096,325 | B2 * | 1/2012 | Pyron | F16L 45/00 174/101 |
| 8,118,330 | B2 * | 2/2012 | Pyron | H02G 3/06 285/154.1 |
| 9,029,715 | B1 * | 5/2015 | Baldwin | H02G 3/081 174/480 |
| 11,381,064 | B2 * | 7/2022 | Wilson, Sr. | H02G 3/0418 |
| 11,744,494 | B2 * | 9/2023 | Rogers | A61B 5/15003 600/573 |
| 2003/0159846 | A1 * | 8/2003 | Takahashi | H02G 3/0608 174/68.3 |
| 2007/0215614 | A1 * | 9/2007 | Matsui | H05K 5/0069 220/3.2 |
| 2008/0236862 | A1 * | 10/2008 | Elder | H02G 3/0418 174/87 |
| 2009/0056971 | A1 * | 3/2009 | Pyron | H02G 3/081 174/68.1 |
| 2009/0223958 | A1 * | 9/2009 | Pyron | H02G 3/06 220/241 |
| 2009/0314512 | A1 * | 12/2009 | Bing | H02G 3/081 174/68.3 |
| 2011/0120582 | A1 * | 5/2011 | Veillette | H02G 3/086 138/109 |
| 2019/0288494 | A1 * | 9/2019 | Morse | H02G 3/0481 |
| 2023/0134178 | A1 * | 5/2023 | Henley | H02G 3/0418 174/68.1 |

* cited by examiner

CONDUIT BODY ASSEMBLIES HAVING ATTACHED COVERS

CROSS REFERENCE TO RELATED APPLICATIONS

The application claims the benefit of U.S. Provisional Application No. 63/319,648 filed on Mar. 14, 2022, the entire contents of which are incorporated by reference herein.

BACKGROUND

1. Field of the Invention

The present disclosure is related to conduit body assemblies. More particularly, the present disclosure is related to conduit body assemblies having attached covers.

2. Description of Related Art

Electrical conductors are run through residential and commercial settings to conduct electricity from the line or power source to the load. In some installations, the conductor can be run through a protective conduit. These protective conduits can be flexible or rigid and can be made of a variety of materials.

In some conduit installation runs, there is a need to connect or couple two or more conduit legs to one another. This connection between conduit legs can occur at a change in direction of the conduit legs, at a branch or drop from a main conduit, at the end of the length of one leg, at changes in size between conduit legs, at other locations, and combinations thereof.

Typically, conduit bodies are used to couple or connect these conduit legs. Electrical conduit bodies are typically sold with a number of different components—including at least a body portion, cover, and one or more fastening devices.

Some conduit bodies include a removable cover. The removable cover can increase the ease with which conductors are pulled through the conduit legs. Moreover, some conduit bodies can function as junction boxes with two or more lengths of conductors being electrically joined to one another in the body. In these instances, the removable cover allows for such electrical connection to be performed then covered.

During installation of a conduit installation run, different tradespeople and/or contractors are often responsible for different aspects of the installation. For example, one tradesperson may be responsible for mounting the conduit legs into position, while a different tradesperson may be responsible for pulling wire through the legs once installed, and a third tradesperson may be responsible for making all electrical connections.

Thus, it can be common for one or more of the conduit bodies to remain uncovered until the installation process is complete, which can result in one or more covers to become misplaced. When the cover is not installed and discovered during final inspection, there can be a delay while replacement covers are sourced and/or installed.

Accordingly, it has been determined by the present disclosure that there is a continuing need for conduit body assemblies that overcome, alleviate, and/or mitigate one or more of the aforementioned and other deleterious effects of the prior art.

SUMMARY

An electrical conduit body assembly is provided. The assembly includes a body portion, a cover, and a movable connection. The movable connection connects the body portion and the cover to one another so that the cover can be moved with respect to the body portion between an open state and a closed state in a manner that prevents the cover from being misplaced or disassociated from the body portion.

In some embodiments either alone or together with any one or more of the aforementioned and/or after-mentioned embodiments, the assembly further includes a fastener that secure the cover to the body portion in the closed state. The fastener and/or the cover prevents the fastener from being misplaced or disassociated from the cover.

In some embodiments either alone or together with any one or more of the aforementioned and/or after-mentioned embodiments, the movable connection includes a hinge. The hinge has a first knuckle on the body portion, second knuckle on the cover, and a hinge pin passing through the first and second knuckles.

In some embodiments either alone or together with any one or more of the aforementioned and/or after-mentioned embodiments, the hinge has a feature selected from a group consisting of: the first knuckle being integrally formed as one piece with the body portion, the first knuckle being formed as a separate component but permanently or removably affixed to the body portion, the second knuckle being integrally formed as one piece with the cover, and the second knuckle being formed as a separate component but permanently or removably affixed to the cover.

In some embodiments either alone or together with any one or more of the aforementioned and/or after-mentioned embodiments, the assembly further includes a gasket that forms a seal between the body portion and the cover when the cover is in the closed state.

In some embodiments either alone or together with any one or more of the aforementioned and/or after-mentioned embodiments, the gasket is integrally formed as one piece with the body portion and/or with the cover and/or is formed as a separate component but permanently or removably affixed to the body portion and/or to the cover.

In some embodiments either alone or together with any one or more of the aforementioned and/or after-mentioned embodiments, the body portion secures two conduit legs to one another.

In some embodiments either alone or together with any one or more of the aforementioned and/or after-mentioned embodiments, the body portion secures two conduit legs to one another with a change in direction of between 5 and 175 degrees.

In some embodiments either alone or together with any one or more of the aforementioned and/or after-mentioned embodiments, the body portion and/or the cover are formed of a conductive material or a non-conductive material.

In some embodiments either alone or together with any one or more of the aforementioned and/or after-mentioned embodiments, the movable connection includes an opening and a strap that passes through the opening. The strap is formed on one of the body portion and the cover and the opening is formed on the other of the body portion and the cover.

In some embodiments either alone or together with any one or more of the aforementioned and/or after-mentioned embodiments, the fastener includes a screw operable spring clip carried by the cover that releasably engages a lip defined in the body portion when the cover is in the closed state.

In some embodiments either alone or together with any one or more of the aforementioned and/or after-mentioned embodiments, the screw operable spring clip includes a lead surface that, during a closing movement of the cover with respect to the body portion, acts as a cam surface by acting on an upper side of the lip to deflect the spring clip until the lead surface passes the lip and resiliently returns to a position that interferes with the lip.

In some embodiments either alone or together with any one or more of the aforementioned and/or after-mentioned embodiments, the screw operable spring clip includes a threaded member that, upon rotation, deflects the spring clip until the spring clip is free from interference from the lip.

In some embodiments either alone or together with any one or more of the aforementioned and/or after-mentioned embodiments, the screw operable spring clip includes a threaded member that selectively rotates a lock arm between a position that interferes with the lip and a position that does not interfere with the lip.

In some embodiments either alone or together with any one or more of the aforementioned and/or after-mentioned embodiments, the screw operable spring clip is resiliently engaged with the lip in the closed state.

In some embodiments either alone or together with any one or more of the aforementioned and/or after-mentioned embodiments, the movable connection includes a pin on the body portion that passes through an opening on the cover.

In some embodiments either alone or together with any one or more of the aforementioned and/or after-mentioned embodiments, the pin is integrally formed as one piece with the body portion and has a deformation that prevents the cover from being removed from the pin.

In some embodiments either alone or together with any one or more of the aforementioned and/or after-mentioned embodiments, the movable connection includes a tether that movably secures the cover and the body portion to one another.

In some embodiments either alone or together with any one or more of the aforementioned and/or after-mentioned embodiments, the assembly further includes a fastener configured to secure the cover to the body portion in the closed state, wherein the fastener and/or the cover is configured to prevent the fastener from being misplaced or disassociated from the cover.

In some embodiments either alone or together with any one or more of the aforementioned and/or after-mentioned embodiments, the fastener secures the tether to the cover.

The above-described and other features and advantages of the present disclosure will be appreciated and understood by those skilled in the art from the following detailed description, drawings, and appended claims.

DETAILED DESCRIPTION

Figure 1:
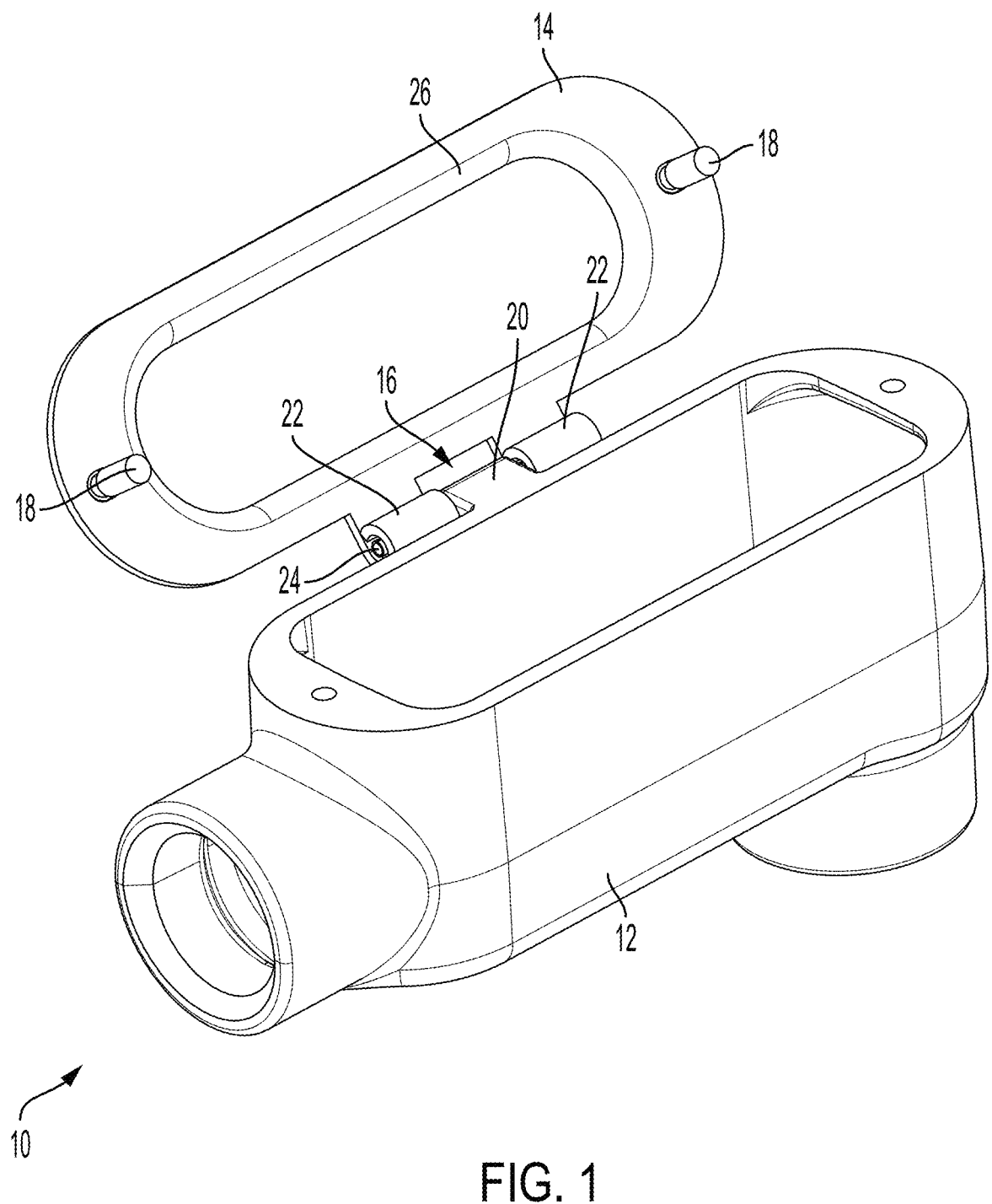
FIG. 1 is a top perspective view of an exemplary embodiment of an electrical conduit body and cover according to the present disclosure, shown with the cover in an open state.
Figure 2:
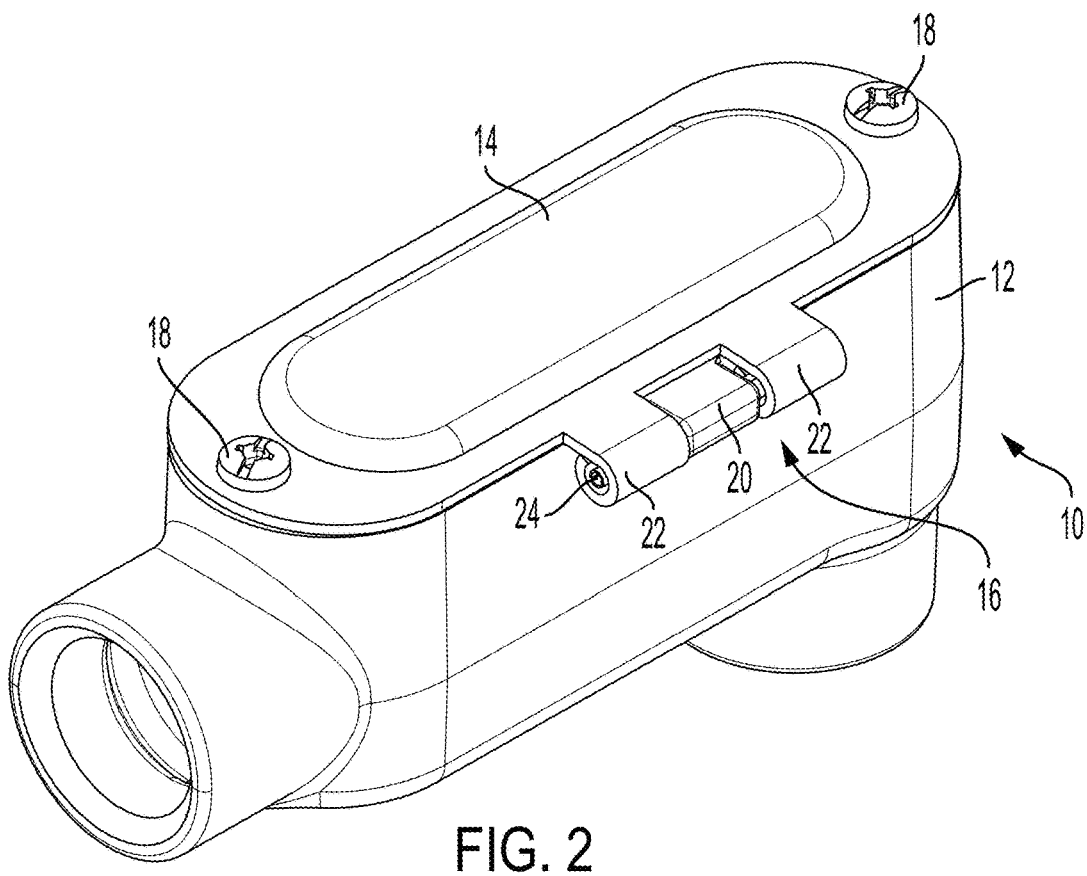
FIG. 2 is a top perspective view of the body of FIG. 1, shown with the cover in a closed state.
Figure 3:
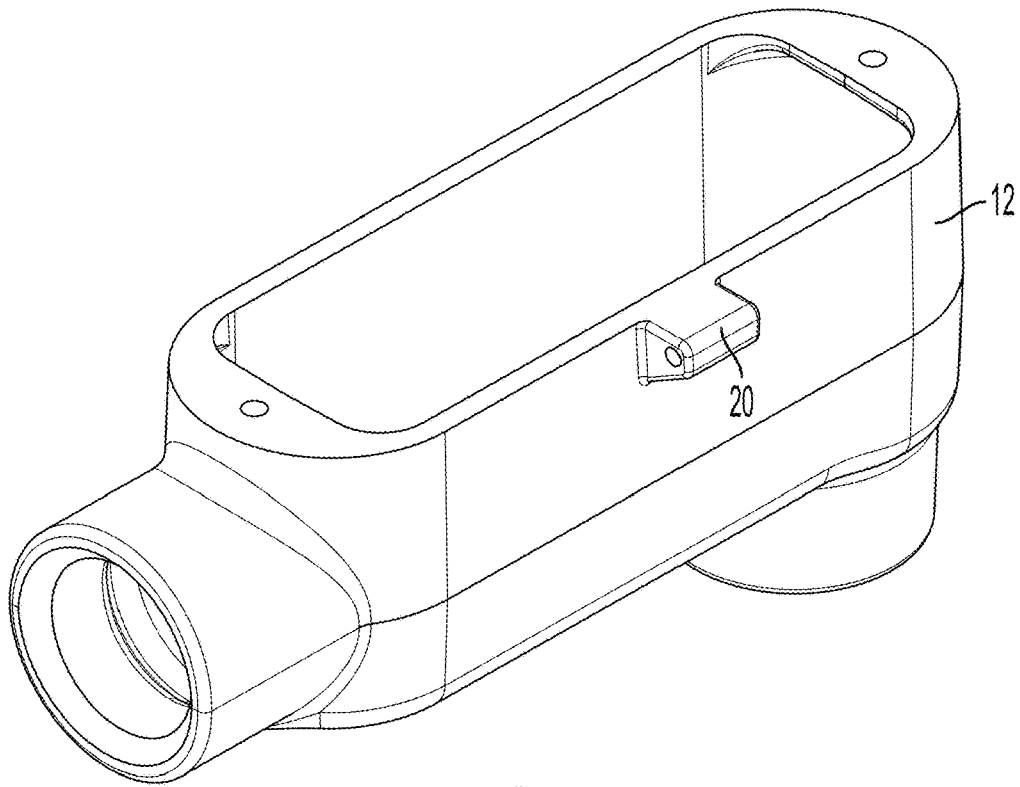
FIG. 3 is a rear perspective view of the body portion of FIG. 1.
Figure 4:
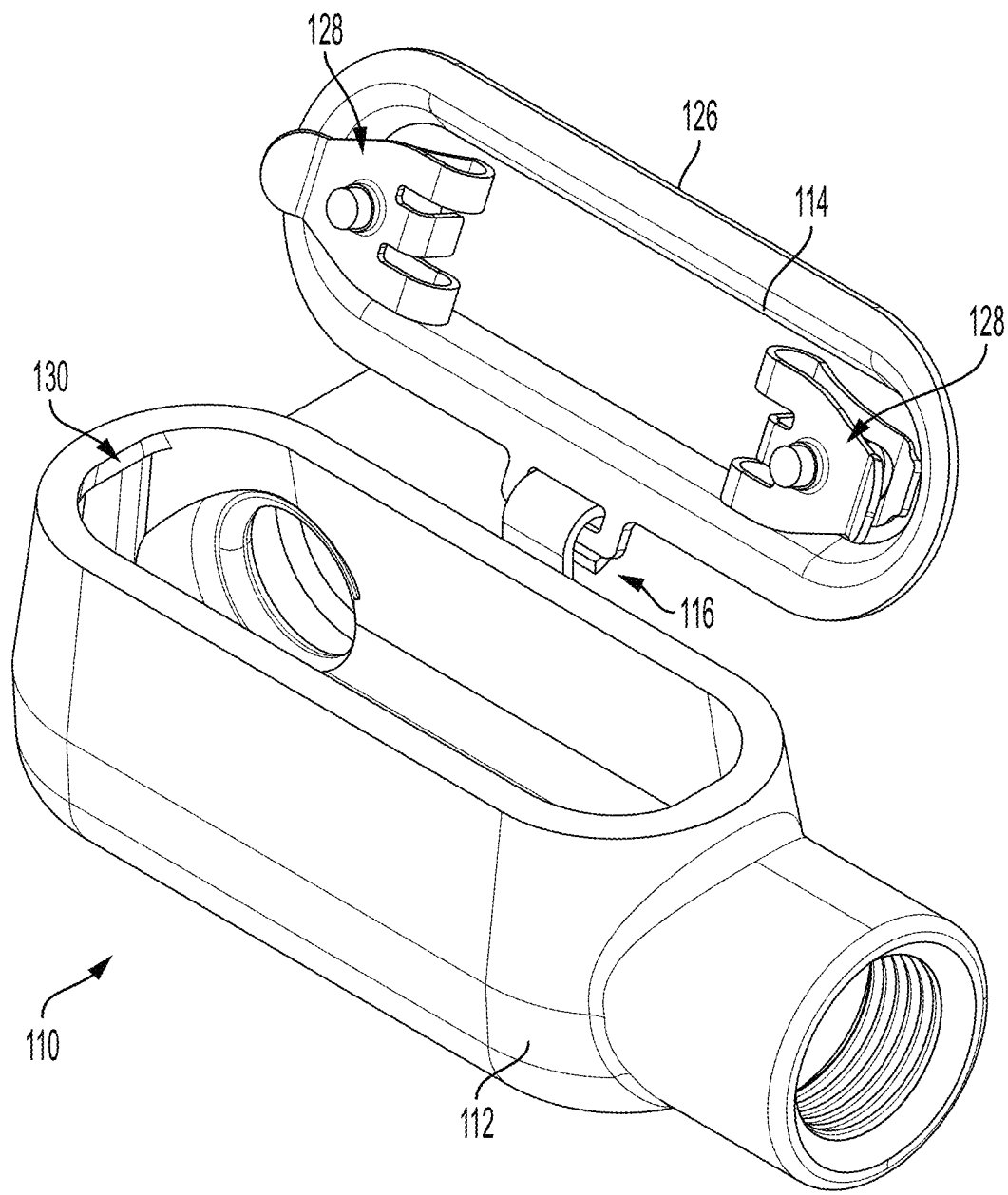
FIG. 4 is a top perspective view of another exemplary embodiment of an electrical conduit body and cover according to the present disclosure, shown with the cover in an open state.
Figure 5:
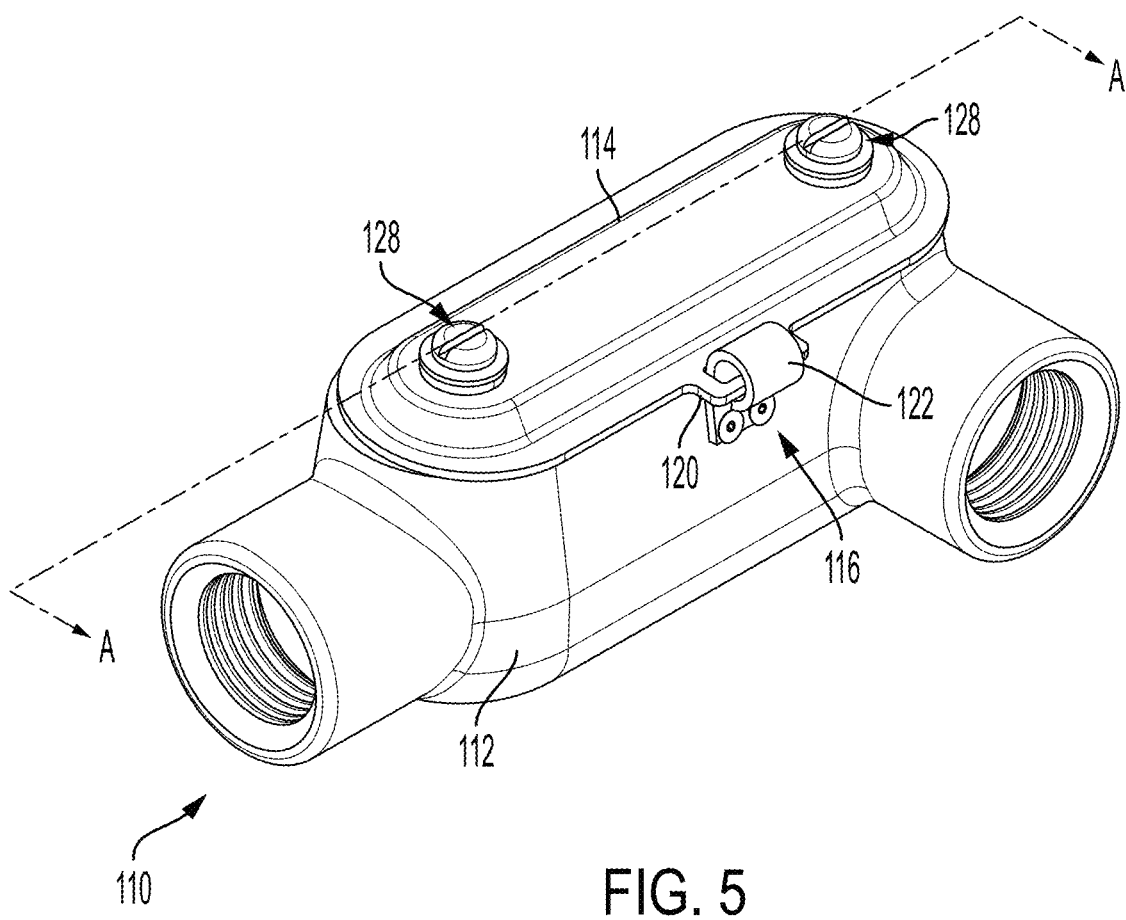
FIG. 5 is a top perspective view of the body of FIG. 4, shown with the cover in a closed state.

Referring to the drawings and in particular to FIGS. 1-3, an exemplary embodiment of an electrical conduit body assembly according to the present disclosure is shown and is generally referred to by reference numeral 10.

Assembly 10 includes a body portion 12 and a cover 14 connected to one another by a movable connection 16. Thus, assembly 10 is configured so that cover 14 can be moved with respect to body portion 12 between an open state (FIG. 1) and a closed state (FIG. 2) in a manner that prevents the cover from being misplaced or disassociated from the body portion.

Assembly 10 can further include a fastener 18 (two shown) configured to secure cover 14 to body portion 12 in the closed state. In the illustrated embodiment, fastener 18 is a screw that threadedly engages openings in body portion 12 in a known manner. In some embodiments, fastener 18 and/or cover 14 are configured to prevent the fastener(s) from being completely removed from the cover in any known manner.

In the embodiment of FIGS. 1-3, movable connection 16 is illustrated as a hinge. Here, movable connection 16 includes a first knuckle 20 on body portion 12, a second knuckle 22 on cover 14, and a hinge pin 24 passing through the first and second knuckles.

First and/or second knuckles 20, 22 can be integrally formed as one piece with body portion 12 and/or with cover 14, respectively. For example, first and/or second knuckles 20, 22 can be co-molded or poured-in-place with body portion 12 and/or with cover 14, respectively.

Alternately, first and/or second knuckles 20, 22 can be formed as a separate component but permanently or removably affixed to body portion 12 and/or to cover 14, respectively. For example, first and/or second knuckles 20, 22 can be permanently or removably affixed to body portion 12 or to cover 14 by an adhesive connection, a welded/thermal connection, an interference fit, and others.

In some embodiments, assembly 10 can further include a gasket 26. Gasket 26 can be configured to form a seal between body portion 12 and cover 14 when the cover is in the closed state.

Gasket 26 can be integrally formed as one piece with body portion 12 and/or with cover 14. For example, gasket 26 can be co-molded or poured-in-place with body portion 12 and/or with cover 14.

Alternately, gasket 26 can be formed as a separate component but permanently or removably affixed to body portion 12 or to cover 14. For example, gasket 26 can be permanently or removably affixed to body portion 12 or to cover 14 by an adhesive connection, a welded/thermal connection, an interference fit, and others.

It should be recognized that assembly 10 is illustrated in FIGS. 1-3 with body portion 12 configured as an elbow—namely to secure two conduit legs (not shown) to one another with a change in direction of 90 degrees. Of course, it is contemplated by the present disclosure for body portion 12 to have any desired configuration including, but not limited to, securing two or more conduit legs to one another with or without a direction change, securing two or more conduit legs to one another with a direction change of between 5 and 175 degrees, and others.

Body portion 12 and cover 14 can be formed of any desired conductive or non-conductive material having the strength and rigidity sufficient to function as an electrical conduit body.

In its simplest form, assembly 10 includes first knuckle 20 molded/cast into the body portion 12 for receipt of hinge pin 24 that is inserted through second knuckle 22 in the form of bent/curled portions of stamped or molded cover 14.

In this manner, assembly 10 ensures that all of the necessary components to properly enclose the conductor remain in position, preventing loss of time and materials.

Referring now to FIGS. 4-7, another exemplary embodiment of an electrical conduit body assembly according to the present disclosure is shown and is generally referred to by reference numeral 110.

Assembly 110 includes a body portion 112 and a cover 114 connected to one another by a movable connection 116. Thus, assembly 110 is configured so that cover 114 can be moved with respect to body portion 112 between an open state (FIG. 4) and a closed state (FIG. 5) in a manner that prevents the cover from being misplaced or disassociated from the body portion.

Assembly 110 can further include a fastener 118 (two shown) configured to secure cover 114 to body portion 112 in the closed state. In the illustrated embodiment, fastener 118 includes a includes a screw operable spring clip 128 carried by cover 114, that releasably engages a lip 130 defined in body portion 112.

Figure 6:
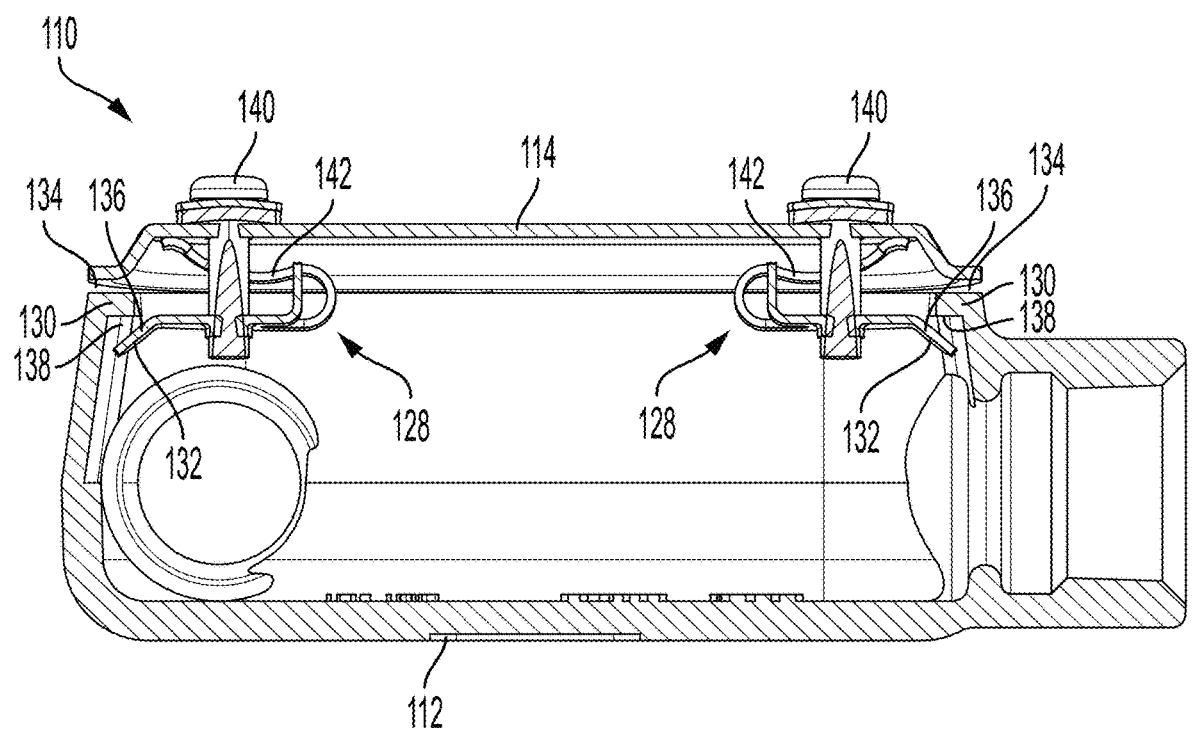
FIG. 6 is a section view of the body of FIG. 5 taken along line A-A.
Figure 7:
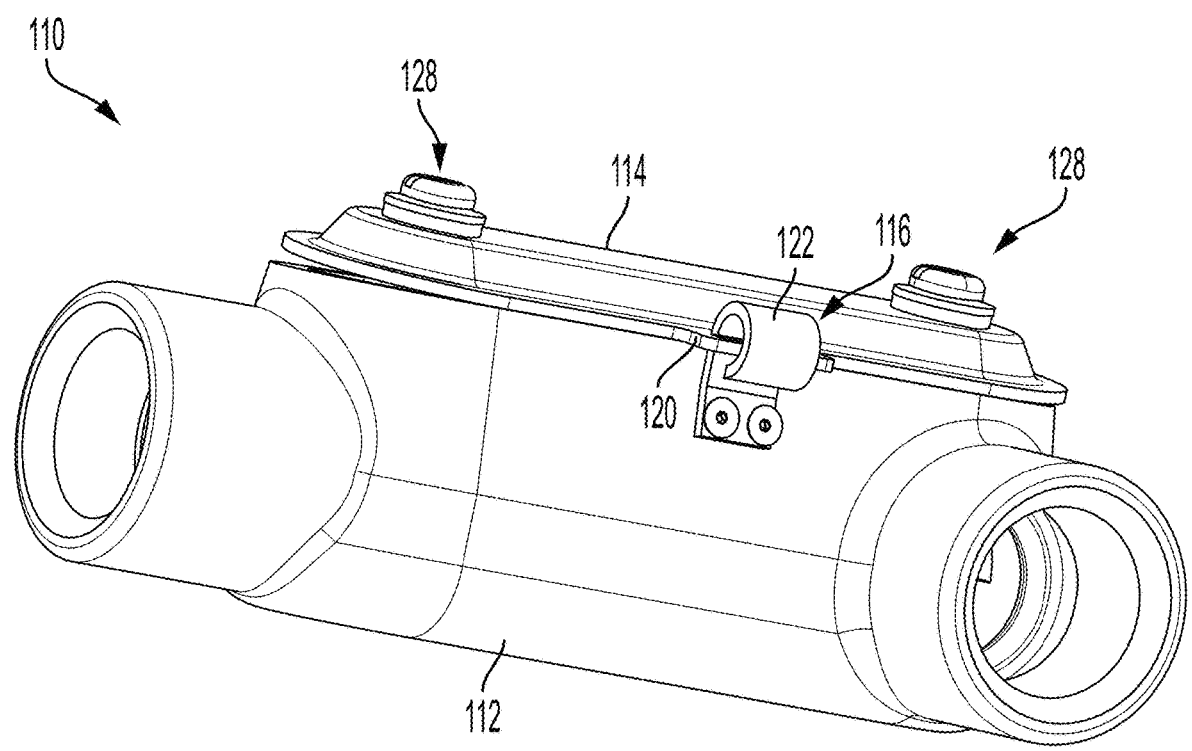
FIG. 7 is a rear perspective view of the body of FIG. 4.

Spring clip 128 has a lead surface 132 that, during a closing movement of cover 114 with respect to body portion 112, acts as a cam surface by acting on an upper side 134 of lip 130 to deflect the spring clip until the spring clip passes the lip and resilient returns to its normal position with cover 114 closed on body portion 112 as shown in FIG. 6. In the closed position, spring clip 128 has an upper surface 136 that interferes with lip 130 to prevent cover 114 from moving from the closed state. In some embodiments, spring clip 128 is configured so that upper surface 136 maintains contact with a lower surface 138 of lip 130 to resiliently urge cover 114 to the closed state.

Spring clip 128 further includes a threaded member 140 engaged with a top portion 142 of the spring clip. When opening assembly 10, the user can tighten member 140 to deflect spring clip 128 by drawing top portion 142 upwards toward cover 114, which moves lead surface inward towards a center of body portion 112 so that upper surface 136 of the spring clip is free from interference with lip 130.

In the embodiment of FIGS. 4-7, movable connection 116 is illustrated as a strap hinge—that lacks the hinge pin of assembly 10. Here, movable connection 116 includes an opening 120 and a strap 122 that passes through the opening. In the illustrated embodiment, opening 120 is on cover 114 and strap 122 on in body portion 112 with the opening 120 being integrally formed as one piece with the cover 114, while at least one side of strap 122 is integrally formed or formed as a separate component but permanently or removably affixed to body portion 112.

Of course, it is contemplated by the present disclosure for opening 120 to be on body portion 112 and for strap 122 to be on cover 114.

In some embodiments, assembly 110 can further include a gasket 126. Gasket 126 can be configured to form a seal between body portion 112 and cover 114 when the cover is in the closed state. Gasket 126 can be integrally formed as one piece with body portion 112 and/or with cover 114. Alternately, gasket 126 can be formed as a separate component but permanently or removably affixed to body portion 112 or to cover 114.

It is contemplated by the present disclosure for body portion 112 to have any desired configuration including, but not limited to, securing two or more conduit legs to one another with or without a direction change, securing two or more conduit legs to one another with a direction change of between 5 and 175 degrees, and others.

In its simplest form, assembly 110 provides a looped strap 120 on body portion 112 that mates with an opening on the stamped or molded cover 112.

In this manner, assembly 110 ensures that all of the necessary components to properly enclose the conductor remain in position, preventing loss of time and materials.

Figure 8:
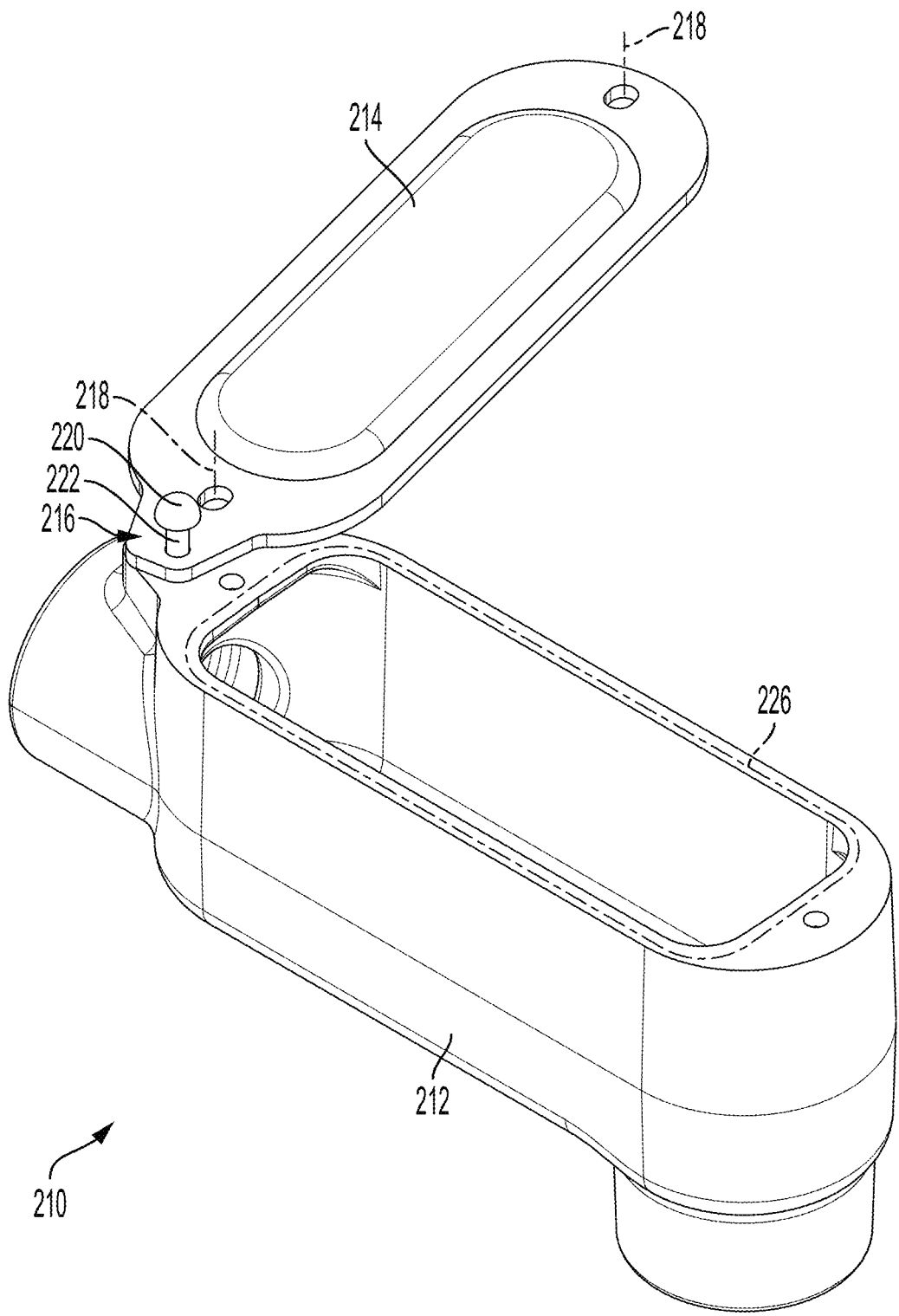
FIG. 8 is a top perspective view of a third exemplary embodiment of an electrical conduit body and cover according to the present disclosure, shown with the cover in an open state.
Figure 9:
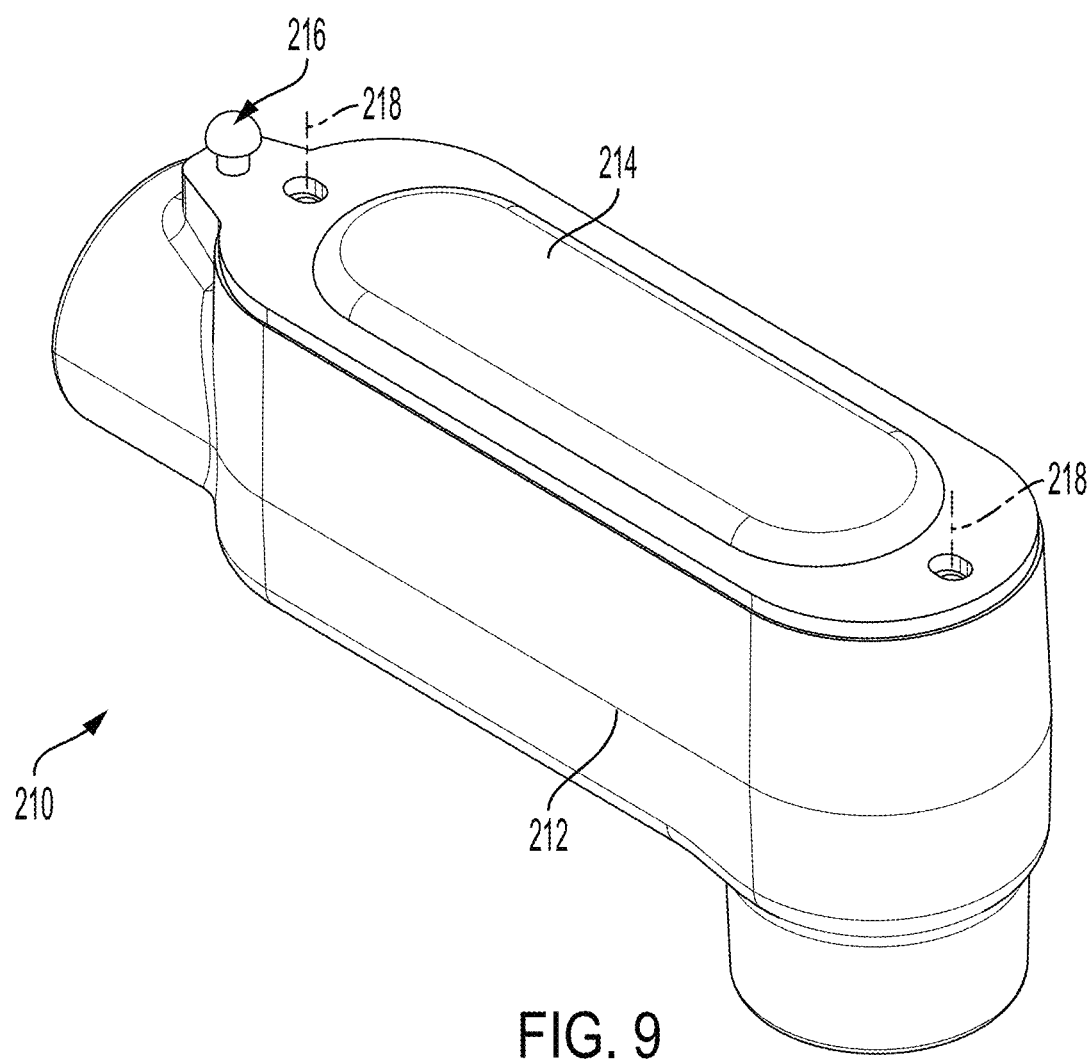
FIG. 9 is a top perspective view of the body of FIG. 8, shown with the cover in a closed state.
Figure 10:
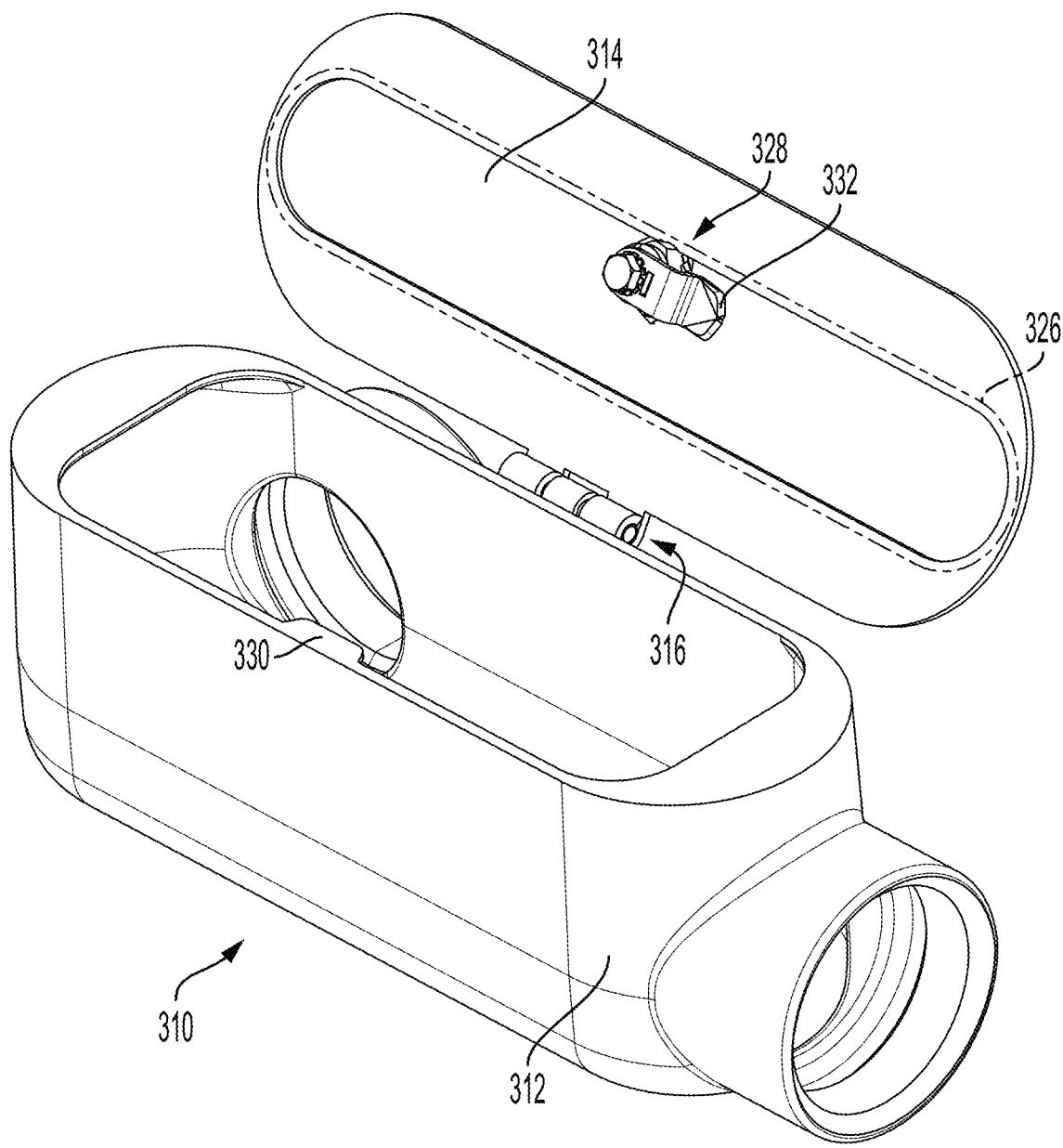
FIG. 10 is a top perspective view of a fourth exemplary embodiment of an electrical conduit body and cover according to the present disclosure, shown with the cover in an open state.
Figure 11:
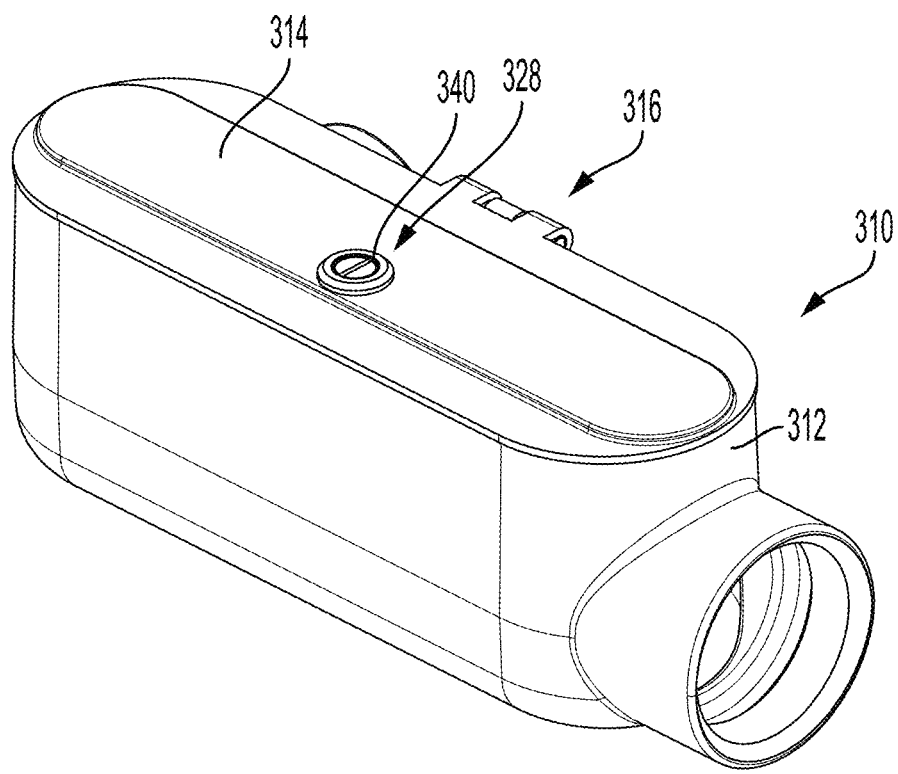
FIG. 11 is a top perspective view of the body of FIG. 10, shown with the cover in a closed state.

Referring now to FIGS. 8-9, another exemplary embodiment of an electrical conduit body assembly according to the present disclosure is shown and is generally referred to by reference numeral 210.

Assembly 210 includes a body portion 212 and a cover 214 connected to one another by a movable connection 216 so that the cover can be moved with respect to the body portion between the open state (FIG. 8) and the closed state (FIG. 9) in a manner that prevents the cover from being misplaced or disassociated from the body portion.

Assembly 210 can further include a fastener 218 (two shown) configured to secure cover 214 to body portion 212 in the closed state. In the illustrated embodiment, fastener 218 is a screw that threadedly engages openings in body portion 212 in a known manner. In some embodiments, fastener 218 and/or cover 214 are configured to prevent the fastener(s) from being completely removed from the cover in any known manner.

In the embodiment of FIGS. 8-9, movable connection 216 is illustrated as a pivot. Here, movable connection 216 includes a pin 220 on body portion 212 that passes through an opening 222 on cover 214.

In some embodiments, pin 220 is integrally formed as one piece with body portion 212 by, for example, molding or casting in place. Then, cover 214 can be positioned on body portion 212 with pin 220 through opening 222. Once cover 214 is in position, pin 220 can be deformed to prevent removal of the cover.

Alternately, pin 220 can be formed separately from body portion 212 and passed through opening 222 of cover 214 into an opening formed in the body portion to prevent removal of the cover while allowing motion of the cover with respect to the body.

In some embodiments, assembly 210 can further include a gasket 226. Gasket 226 can be configured to form a seal between body portion 212 and cover 214 when the cover is in the closed state. Gasket 226 can be integrally formed as one piece with body portion 212 and/or with cover 214. Alternately, gasket 226 can be formed as a separate component but permanently or removably affixed to body portion 212 or to cover 214.

It is contemplated by the present disclosure for body portion 212 to have any desired configuration including, but not limited to, securing two or more conduit legs to one another with or without a direction change, securing two or more conduit legs to one another with a direction change of between 5 and 175 degrees, and others.

Thus in its simplest form, assembly 210 provides a pin 120 on body portion 212 that passes through an opening on the stamped or molded cover 212.

In this manner, assembly 210 ensures that all of the necessary components to properly enclose the conductor remain in position, preventing loss of time and materials.

Referring now to FIGS. 10-13, another exemplary embodiment of an electrical conduit body assembly according to the present disclosure is shown and is generally referred to by reference numeral 310.

Assembly 310 includes a body portion 312 and a cover 314 connected to one another by a movable connection 316 so that the cover can be moved with respect to the body portion between the open state (FIG. 10) and the closed state (FIG. 11) in a manner that prevents the cover from being misplaced or disassociated from the body portion.

Assembly 310 can further include a fastener, which is shown as a screw operable spring clip 328 (one shown) that is configured to secure cover 314 to body portion 312 in the closed state. In the illustrated embodiment, screw operable spring clip 328 is configured to engage with a lip 330 defined in body portion 312.

Figure 12:
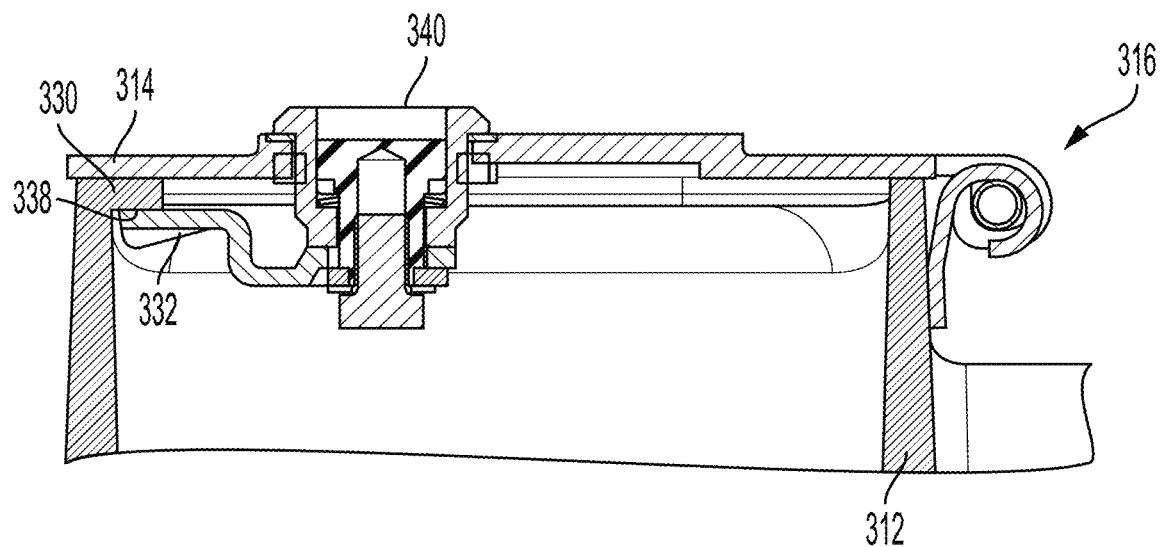
FIG. 12 is a section view of the body of FIG. 11 taken along line B-B.
Figure 13:
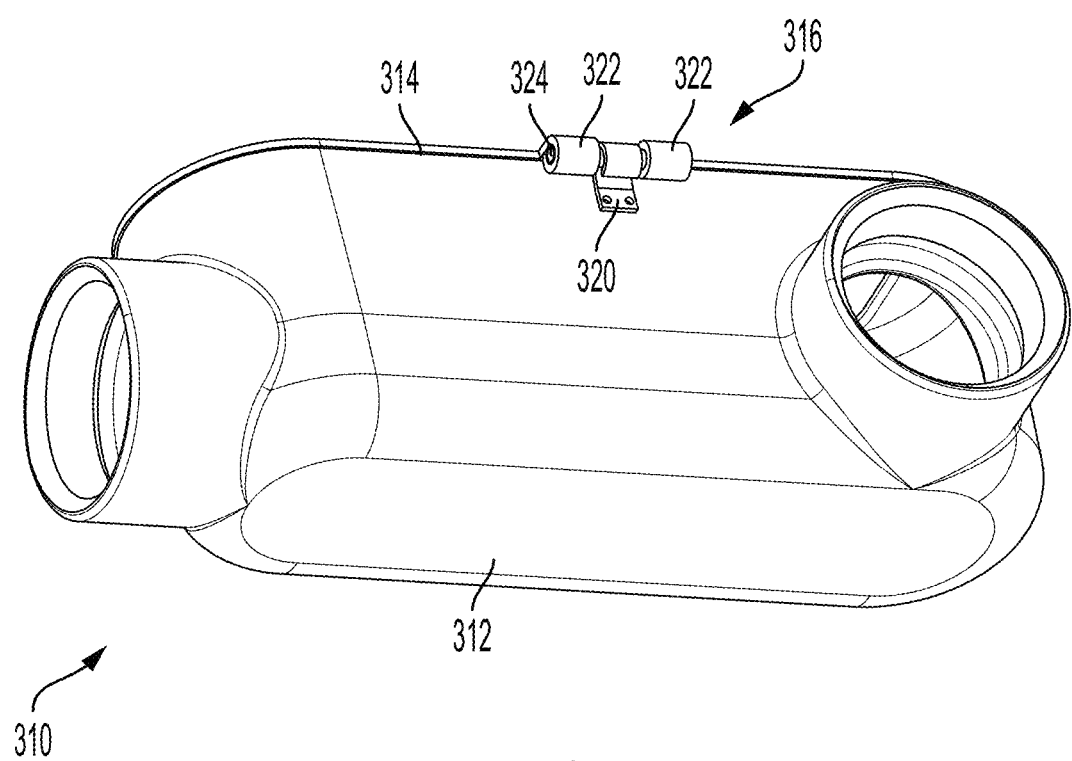
FIG. 13 is a rear perspective view of the body of FIG. 10.

After closing cover 314 onto body portion 312, clip 328 can be rotated via threaded member 340 so that a lock arm 332 of the clip 328 passes below a lower side 338 of lip 330 as shown in FIG. 12. In this position, lock arm 332 interferes with lip 330 to prevent cover 314 from moving from the closed state. In some embodiments, clip 328 is configured so that lock arm 332 maintains contact with a lower side 338 of lip 330 to resiliently urge cover 314 to the closed state. Clip 328 is unlocked by rotating threaded member 340 so that lock arm 332 of the clip 328 is free from interference with lower side 338 of lip 330.

For purposes of clarity, screw operable spring clip 128 and screw operable spring clip 328 are compared. Clip 128 is locked by the action of moving cover 114 with respect to body 112 from the open to the closed state, and is unlocked by rotation of the threaded member 140. By comparison, clip 328 is and unlocked locked by rotation of fastener 340.

In the embodiment of FIGS. 10-13, movable connection 316 is illustrated as a hinge. Here, movable connection 316 includes a first knuckle 320 on body portion 312, a second knuckle 322 on cover 314, and a hinge pin 324 passing through the first and second knuckles.

First and/or second knuckles 320, 322 can be integrally or separately formed with body portion 312 and/or with cover 314, respectively. In the illustrated embodiment, second knuckle 322 is integrally formed as one piece with cover 314, while first knuckle 320 is a strap having one side formed as a separate component but permanently or removably affixed to body portion 312.

In some embodiments, assembly 310 can further include a gasket 326. Gasket 326 can be configured to form a seal between body portion 312 and cover 314 when the cover is in the closed state. Gasket 326 can be integrally formed as one piece with body portion 312 and/or with cover 314. Alternately, gasket 326 can be formed as a separate component but permanently or removably affixed to body portion 312 or to cover 314.

It is contemplated by the present disclosure for body portion 312 to have any desired configuration including, but not limited to, securing two or more conduit legs to one another with or without a direction change, securing two or more conduit legs to one another with a direction change of between 5 and 175 degrees, and others.

In this manner, assembly 310 ensures that all of the necessary components to properly enclose the conductor remain in position, preventing loss of time and materials.

Figure 14:
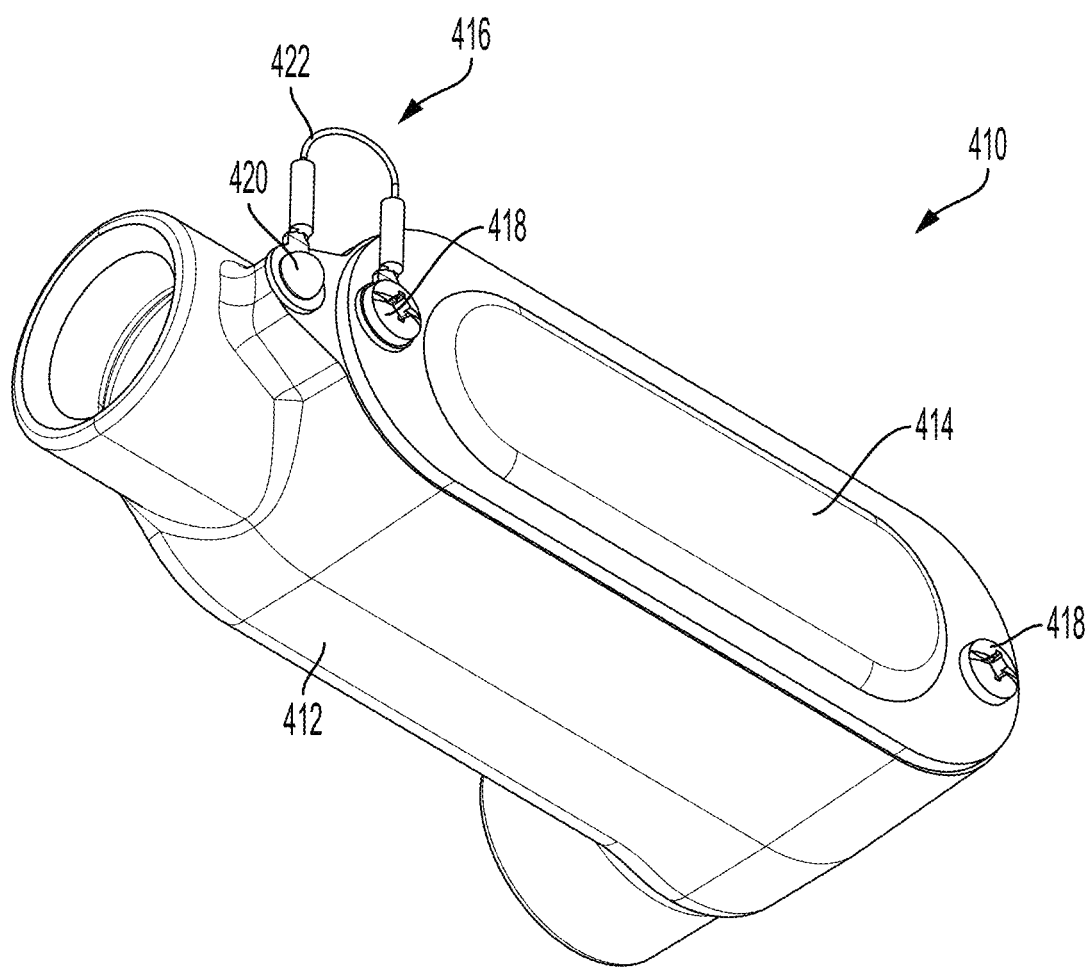
FIG. 14 is a top perspective view of a fifth exemplary embodiment of an electrical conduit body and cover according to the present disclosure, shown with the cover in a closed state.
Figure 15:
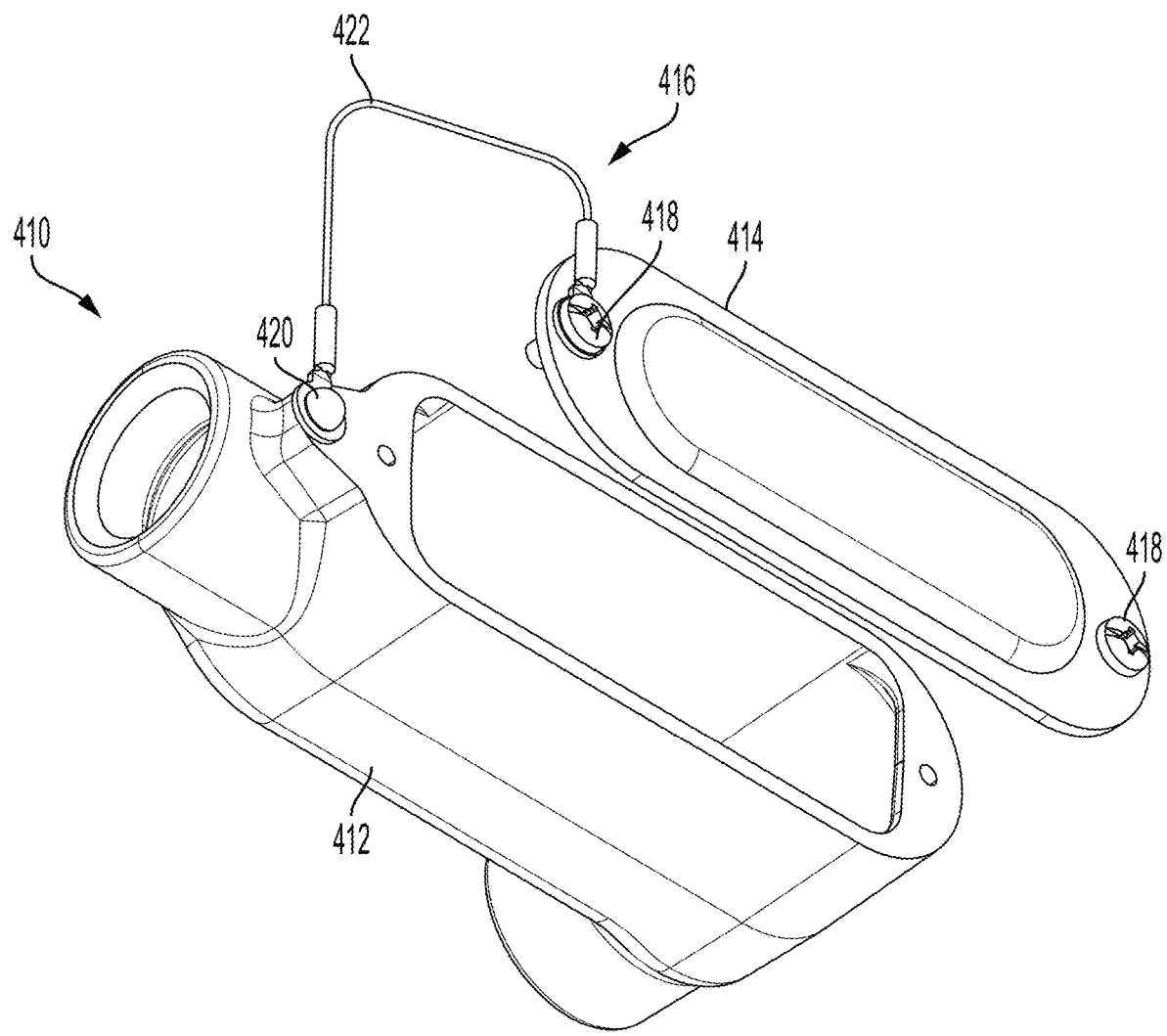
FIG. 15 is a top perspective view of the body of FIG. 14, shown with the cover in an open state.

Referring now to FIGS. 14-15, another exemplary embodiment of an electrical conduit body assembly according to the present disclosure is shown and is generally referred to by reference numeral 410.

Assembly 410 includes a body portion 412 and a cover 414 connected to one another by a movable connection 416 so that the cover can be moved with respect to the body portion between a closed state (FIG. 14) and an open state (FIG. 15) in a manner that prevents the cover from being misplaced or disassociated from the body portion.

In the embodiment of FIGS. 14-15, movable connection 416 is illustrated as a tether. Here, movable connection 416 includes a feature 420 on body portion 412 and a tether 422. Tether 422 is secured to feature 420 and is secured to a fastener 418 on cover 414. In this manner, assembly 410 ensures that all of the necessary components to properly enclose the conductor remain in position, preventing loss of time and materials.

Fastener 418 (two shown) is configured to secure cover 414 to body portion 412 in the closed state. In the illustrated embodiment, fastener 418 is a screw that threadedly engages openings in body portion 412 in a known manner. In some embodiments, fastener 418 and/or cover 414 are configured to prevent the fastener(s) from being completely removed from the cover in any known manner. Preferably, at least the fastener 418 securing tether 422 to cover 414 configured to prevent the fastener(s) from being completely removed from the cover in any known manner.

Feature 420 is shown in the illustrated embodiment as a pin, permanently securing tether 422 to body portion 412. Of course, it is contemplated by the present disclosure for feature 420 to include any other fastening mechanism such as, but not limited to, mechanical fastening, welded fastening, glued fastening, and any combinations thereof.

It should also be recognized that tether 422 is shown secured to cover 414 by fastener 418. Of course, it is contemplated by the present disclosure for feature 420 to include any other fastening mechanism such as, but not limited to, mechanical fastening, welded fastening, glued fastening, and any combinations thereof.

As disclosed herein, assemblies 10, 110, 210, 310, 410 are provided with a cover that is movably connected directly to the body portion, which eliminate the chances of losing/ dropping the cover and lowering the chances of forgetting to close the cover during final installation.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST assembly 10
body portion 12
cover 14
movable connection 16
fastener 18
first knuckle 20
second knuckle 22
hinge pin 24
gasket 26
assembly 110
body portion 112
cover 114
movable connection 116
fastener 118
screw operable spring clip 128
lip 130
lead surface 132
upper side 134 of lip 130
upper surface 136 of spring clip 128
lower surface 138 of lip 130
threaded member 140
top portion 142 of spring clip 128
opening 120
strap 122
gasket 126
assembly 210
body portion 212
cover 214
movable connection 216
fastener 218
pin 220
opening 222
gasket 226
assembly 310
body portion 312
cover 314
first knuckle 320
second knuckle 322
hinge pin 324
gasket 326
screw operable spring clip 328
lip 330
lock arm 332 of lock 328
lower side 338 of lip 330
threaded member 340
electrical conduit body assembly 410
body portion 412
cover 414
movable connection 416
fastener 418
feature 420
tether 422

What is claimed is:

1. An electrical conduit body assembly, comprising:
a body portion having a first knuckle integrally formed as one piece with the body portion;
a cover having a second knuckle integrally formed as one piece with the cover; and
a hinge pin passing through the first and second knuckles, wherein the first and second knuckles and the hinge pin define a movable connection connecting the body portion and the cover to one another so that the cover can be moved with respect to the body portion between an open state and a closed state in a manner that prevents the cover from being misplaced or disassociated from the body portion.

2. The assembly of claim 1, further comprising a fastener configured to secure the cover to the body portion in the closed state, wherein the fastener and/or the cover is configured to prevent the fastener from being misplaced or disassociated from the cover.

3. The assembly of claim 1, further comprising a gasket configured to form a seal between the body portion and the cover when the cover is in the closed state.

4. The assembly of claim 3, wherein the gasket is integrally formed as one piece with the body portion and/or with the cover and/or is formed as a separate component but permanently or removably affixed to the body portion and/or to the cover.

5. The assembly of claim 1, wherein the body portion is configured to secure two conduit legs to one another.

6. The assembly of claim 1, wherein the body portion is configured to secure two conduit legs to one another with a change in direction of between 5 and 175 degrees.

7. The assembly of claim 1, wherein the body portion and/or the cover are formed of a conductive material or a non-conductive material.

8. The assembly of claim 1, further comprising a fastener configured to secure the cover to the body portion in the closed state, wherein the fastener comprises a screw operable spring clip carried by the cover that releasably engages a lip defined in the body portion when the cover is in the closed state.

9. The assembly of claim 8, wherein the screw operable spring clip comprises a lead surface that, during a closing movement of the cover with respect to the body portion, acts as a cam surface by acting on an upper side of the lip to deflect the spring clip until the lead surface passes the lip and resiliently returns to a position that interferes with the lip.

10. The assembly of claim 8, wherein the screw operable spring clip comprises a threaded member that, upon rotation, deflects the spring clip until the spring clip is free from interference from the lip.

11. The assembly of claim 10, wherein the screw operable spring clip comprises a threaded member that selectively rotates a lock arm between a position that interferes with the lip and a position that does not interfere with the lip.

12. The assembly of claim 8, wherein the screw operable spring clip is resiliently engaged with the lip in the closed state.

13. The assembly of claim 1, wherein the body portion comprises two openings through a wall of the body portion so that the body portion surrounds each of the two openings, wherein each of the two openings is configured to secure a different conduit to the body portion.

14. The assembly of claim 13, wherein the body portion is configured to secure the different conduits to one another with a change in direction.

15. The assembly of claim 13, wherein the body portion is configured to secure the different two conduits to one another without a change in direction.

16. The assembly of claim 1, wherein the second knuckle and hinge pin comprise a bent portion of the cover.

17. The assembly of claim 1, wherein the body portion is a molded body portion or cast body portion and/or wherein the cover is a molded cover or a stamped cover.

18. The assembly of claim 1, wherein the body portion has a major axis and a minor axis, and wherein the hinge pin is parallel to the major axis.

19. The assembly of claim 1, wherein the body portion has a major axis and a minor axis, and wherein the body portion has a lip defined at an end of the body portion along the minor axis.

20. The assembly of claim 19, further comprising a fastener configured to secure the cover to the body portion in the closed state, the fastener being securable to the lip.

* * * * *